(12) United States Patent
Isgar

(10) Patent No.: US 12,008,606 B2
(45) Date of Patent: Jun. 11, 2024

(54) VOLUNTEER CONNECTION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 98 days.

(21) Appl. No.: 17/729,299

(22) Filed: Apr. 26, 2022

(65) Prior Publication Data
US 2022/0253911 A1    Aug. 11, 2022

Related U.S. Application Data

(63) Continuation-in-part of application No. 17/157,041, filed on Jan. 25, 2021, now abandoned.

(60) Provisional application No. 62/965,262, filed on Jan. 24, 2020.

(51) Int. Cl.
*G06Q 30/0279* (2023.01)
*G06Q 10/1053* (2023.01)

(52) U.S. Cl.
CPC ..... *G06Q 30/0279* (2013.01); *G06Q 10/1053* (2013.01)

(58) Field of Classification Search
CPC .................................................. G06Q 30/0279
See application file for complete search history.

(56) References Cited

U.S. PATENT DOCUMENTS

| 6,150,955 | A | 11/2000 | Tracy et al. |
| 9,020,848 | B1 | 4/2015 | Ridge et al. |
| 2007/0282661 | A1 | 12/2007 | Franco |
| 2012/0064920 | A1 | 3/2012 | Shaw |
| 2012/0172027 | A1 | 7/2012 | Partheesh et al. |
| 2016/0012410 | A1 | 1/2016 | Hanson et al. |
| 2016/0117643 | A1 | 4/2016 | Bittle |
| 2019/0370871 | A1 | 12/2019 | Isgar |
| 2020/0043055 | A1 | 2/2020 | Olds et al. |

FOREIGN PATENT DOCUMENTS

CA        2919101 C  *  3/2022  ......... G06Q 10/1095

OTHER PUBLICATIONS

Highland, Hermes to offer safe-place pictures of parcels, Sep. 6, 2018, https://www.logisticsmanager.com/hermes-to-offer-safe-place-pictures-of-parcels/, p. 1-2.*
Morell, Hermes Rolls out Safeplace Photo and Geofencing Service Following Trial, Sep. 6, 2018, https://edelivery.net/2018/09/hermes-rolls-safeplace-photo-geofencing-service-following-trial/.

* cited by examiner

*Primary Examiner* — Mehmet Yesildag
*Assistant Examiner* — James Webb
(74) *Attorney, Agent, or Firm* — Schmeiser, Olsen & Watts LLP

(57) ABSTRACT

A volunteer connection system is provided. The system includes a computer server having a memory storing organization data and user data, an organization computing device and one or more user computing devices coupled to the computer server. The computer server may be programmed to send out a request or make available volunteer opportunities that are delivered to or accessed by the user computing devices based on a request from the organization computing device. The user may accept a volunteer request and receive direction on location and time of volunteer service. The system may track and store volunteer data, such as location, aggregate time at location, and the like. This volunteer data may be available for report generation.

17 Claims, 21 Drawing Sheets

VOLUNTEER CONNECTION SYSTEM

CROSS REFERENCE TO RELATED APPLICATIONS

This application is a continuation-in-part of U.S. patent application entitled "VOLUNTEER CONNECTION SYSTEM," Ser. No. 17/157,041, filed Jan. 25, 2021, which claims priority to U.S. Provisional Patent Application entitled "VOLUNTEER CONNECTION SYSTEM," Ser. No. 62/965,262, filed Jan. 24, 2020, the disclosure of which is hereby incorporated entirely herein by reference.

BACKGROUND OF THE INVENTION

Technical Field

This invention relates generally to a charitable volunteer system, and more particularly to a volunteer connection system for connecting volunteers with charitable organizations and/or events and aggregation of volunteer data corresponding to the charitable organizations and/or events.

State of the Art

Organizations and individuals have no system that allows for easy coordination between charitable organizations and/or charitable events and potential volunteers, and further lacks the ability to easily track data of the volunteers and communicate with the volunteers. Organizations historically have various ways of collecting volunteer information. For example, one way is to have a sign in sheet for individuals to sign and indicate that he or she is volunteering and providing contact information that can then be entered into a computer system. Organizations have limited ways of advertising or broadcasting volunteer opportunities. Conventional ways of broadcasting include commercials, advertisement campaigns, social media campaigns and the like. All of these forms are lacking. With the wide adoption of smart devices utilized by volunteers a new system is needed to connect organizations with volunteers, collect volunteer data and provide reporting of the same.

Accordingly, there is a need for an improved system for connecting volunteers with corresponding organizations and collecting and aggregating volunteer data.

DISCLOSURE OF THE INVENTION

The present invention relates to a volunteer connection system for connecting volunteers with charitable organizations and/or events and aggregation of volunteer data corresponding to the charitable organizations and/or events.

A volunteer connection system is disclosed comprising: a computer server having a memory storing organization data of an organization and user data of a user; an organization computing device of the organization coupled to the computer server, the organization computing device associated with the organization registered with the volunteer connection system; and one or more user computing devices of the user coupled to the computer server, the computer server programmed to: receive a signal having a volunteer request for volunteers from the organization computing device and automatically generate and send the volunteer request for the volunteers for the organization to the one or more user computing devices; receive from the one or more user computing devices a signal indicating acceptance of the volunteer request for the volunteers for an event; automatically generate and send to the one or more user computing devices accepting the event, event information comprising event location; generate and establish a proximity zone at a specified geo-location of the event; receive a signal from the one or more user computing devices that the one or more user computing devices have entered the proximity zone and automatically establish a connection between the computer server and the one or more user computing devices in response to the one or more user computing devices entering the proximity zone; automatically generate and send for display on the one or more user computing devices a volunteer interface comprising a message indicating the one or more user computing devices have entered the proximity zone; and automatically track and store volunteer data of the user comprising an accumulated amount of time the one or more user computing devices are within the proximity zone during a designated period of time and locations of the one or more user computing devices within the proximity zone.

The organization data may comprise verification information that the organization is registered with the system. The user data may comprise name and contact information of the user. The contact information may comprise address, email and/or phone number. The organization may be a charitable organization. The volunteer connection system may comprise more than one organization. The one or more user computing devices may be programmed to search for the more than one organization having the volunteer request for the volunteers. The organization may track how many of the more than one user computing devices are within the proximity zone. The volunteer data of the user is reported to the server and retrieved by the organization with user permission. The one or more user computing devices may comprise a timer thereby allowing the user to manually start and stop the timer within the proximity zone. The one or more user computing devices may comprise a camera for authenticating the user is within the proximity zone. The camera may take a photo or video of volunteer services performed. The user may be affiliated with a group or team. The computer server may automatically send verification to the one or more user computing devices in response to the one or more user computing devices entering the proximity zone that the organization is legitimate and/or the proximity zone is associated with the organization. The user may be directed to move from a first location to a second location in the proximity zone in response to the organization requesting the move sent from the organization computing device. The one or more user computing devices may report field conditions in the proximity zone to the organization computing device.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a volunteer connection system that verifies volunteer's location to perform charity work, time that the volunteer is performing charity work, cumulative hours of charity work for a predetermined period time and generates reports regarding the same. The volunteer community is one formed of individuals that desire serve her or his own community as volunteer and organizations that have the desire to do the same.

Volunteers are often unrecognized. Embodiments of this system may be utilized to recognize and reward commitment to charitable work. Embodiment may be utilized to account for cumulative hours volunteered/worked and can be utilized by an organization such as school to track how the organization meets individual and team goals of volunteering. Additionally, embodiments may be utilized to match the volunteer hours with the individual hours worked and can be used for validation of service rendered by the volunteers.

While some embodiments automate the tracking and validation processes, some embodiments operate for just reporting hours worked without GPS or location because it is still a useful option for some organization. Accordingly, some volunteer organization may benefit from this system as self-reporting and not have sophisticated tracking. In such embodiments, the system may operate to keep aggregated hours worked for individuals, teams and organizations and then allow for reporting of the same by each volunteer as part of the aggregation system.

Figure 1:
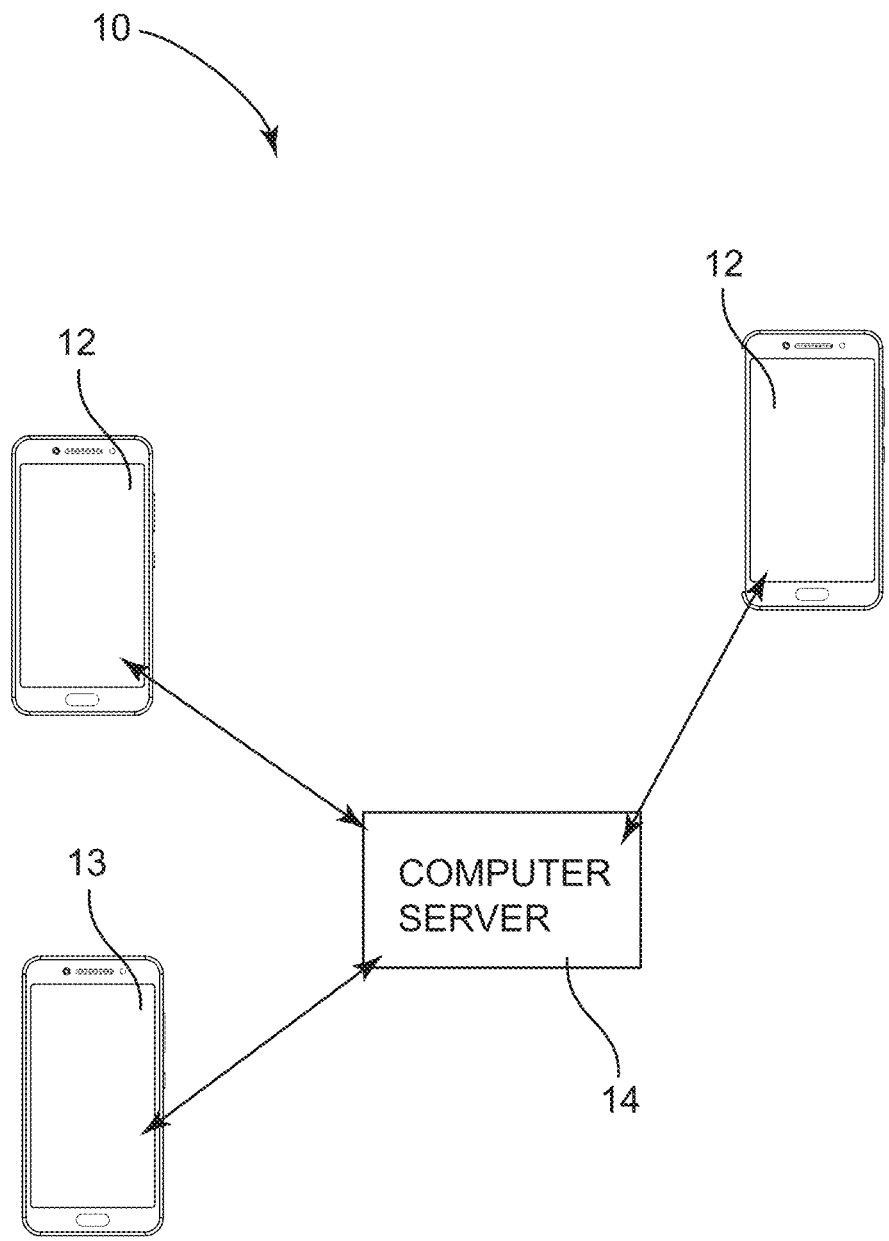
FIG. 1 is a diagrammatic view of a volunteer connection system in accordance with an embodiment.

Referring to the drawings, FIG. 1 depicts an embodiment of a volunteer connection system 10. The system 10 may include one or more user (volunteer) computing devices 12 coupled to a computer server 14 and an organization computing device 13 coupled to the computer server 14. These couplings may be network connections, such as through an Internet connection, wherein the user computing devices 12 and organization computing device 13 may communicate with and receive communication from the server 14. In embodiments, the user computing device 12 and/or the organization computing device 13 may be, without limitation, a smartphone, a tablet, a computer or the like.

Figure 6:
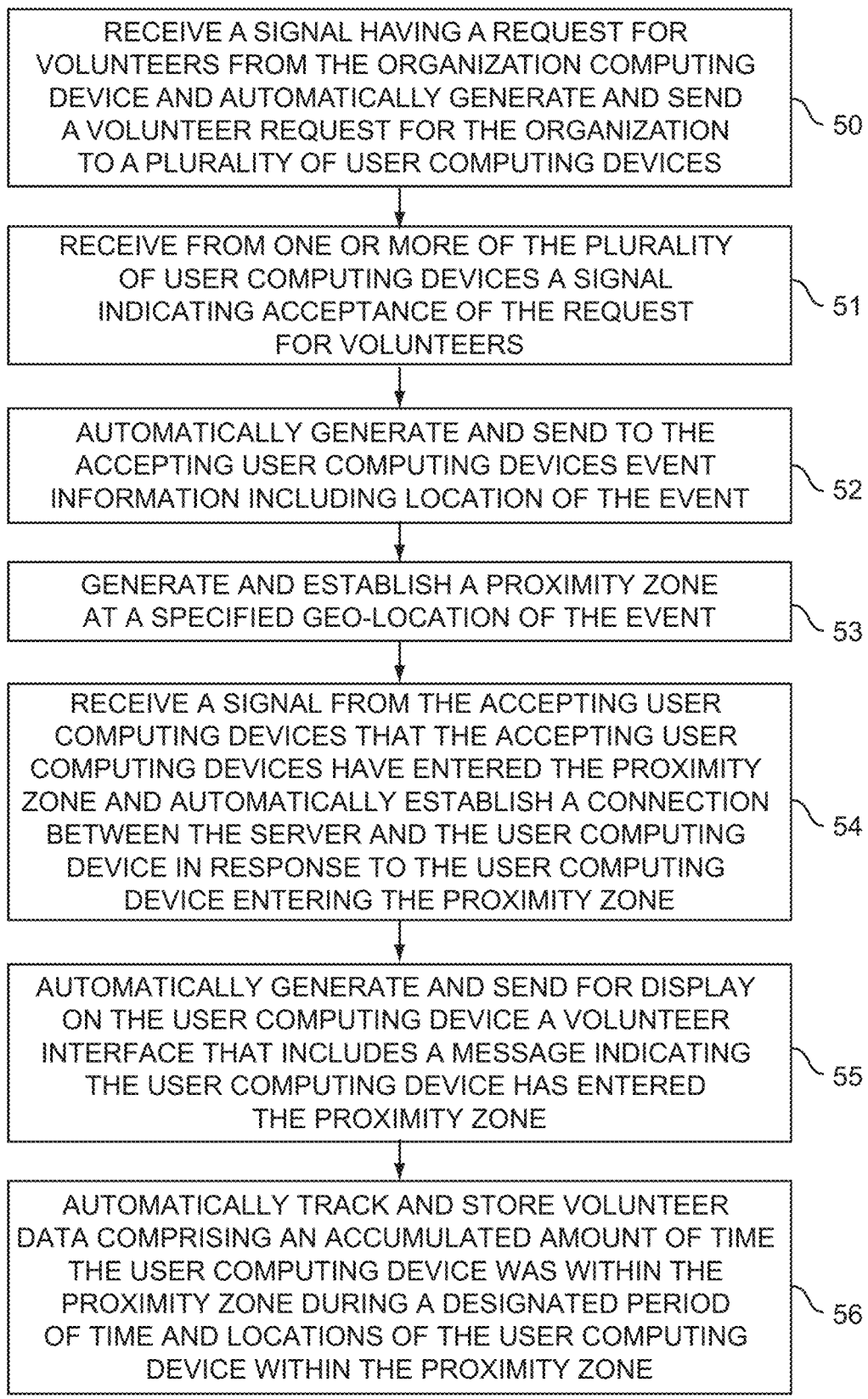
FIG. 6 is a flow chart of programmed steps of a computer server of a volunteer connection system in accordance with an embodiment.

The computer server 14 may include a memory storing organization data corresponding to various organizations and user data. The organization data includes verification information that the organizations are registered with the system 10 and may include location of events where volunteers are needed or where volunteers may participate. The user data may include name, contact information including address, email and phone number, and the like for the user of a user computing device 12 of the system 10. An organization computing device 13 and one or more user computing devices 12 may be coupled to the computer server 14, and, referring additionally to FIG. 6, the computer server 14 may be programmed to receive a signal having a request for volunteers from the organization computing device and automatically generate and send a volunteer request for the organization to a plurality of user computing devices (Step 50); receive from one or more of the plurality of user computing devices a signal indicating acceptance of the request for volunteers (Step 51); automatically generate and send to the accepting user computing devices event information including location of the event (Step 52); generate and establish a proximity zone at a specified geo-location of the event (Step 53); receive a signal from the accepting user computing devices that the accepting user computing devices have entered the proximity zone and automatically establish a connection between the server and the user computing device in response to the user computing device entering the proximity zone (Step 54); automatically generate and send for display on the user computing device a volunteer interface that includes a message indicating the user computing device has entered the proximity zone (Step 55); and automatically track and store volunteer data comprising an accumulated amount of time the user computing device was within the proximity zone during a designated period of time and locations of the user computing device within the proximity zone (Step 56).

The proximity zone 18 may be a predetermined size, such as a radius or space located at a geographical location or geo-location. The size of the proximity zone 18 may be determined by the server 14 and correlates to the organization utilizing the system 10. The proximity zone 18 may include, but is not limited to a geofence, a Wi-Fi signal quadrant, such as a 5G Wi-Fi signal quadrant, or any other means of establishing a proximity zone.

The computer server 14 may further be programmed to verify the organization as legitimate and communicate the verification to the user computing device 12 in response to the user computing device accessing the system within the proximity zone 18. In some embodiments, the computer server 14 is further programmed to automatically verify the charitable organization as legitimate and communicate the verification to the user computing device 12 in response to the user computing device 12 entering the proximity zone 18. An organization such as, but not limited to, a charitable organization may register with the system 10, and the system may verify the charitable organization as legitimate and store the verification in memory on the server 14. Accordingly, the computer server 14 may be programmed to access its memory to determine or verify if the charitable organization associated with the proximity zone(s) 18 is legitimate and to verify that the proximity zone(s) 18 is legitimately associated with the charitable organization, wherein the server 14 receives an identification of the proximity zone(s) 18 when the proximity zone(s) 18 are activated and confirms that the identification of proximity zone(s) 18 is assigned to the charitable organization. In at least this way, there is a two-step verification of verifying the charitable organization as legitimate and verifying that the proximity zone 18 is associated or assigned to that legitimate charitable organization.

Figure 2A:
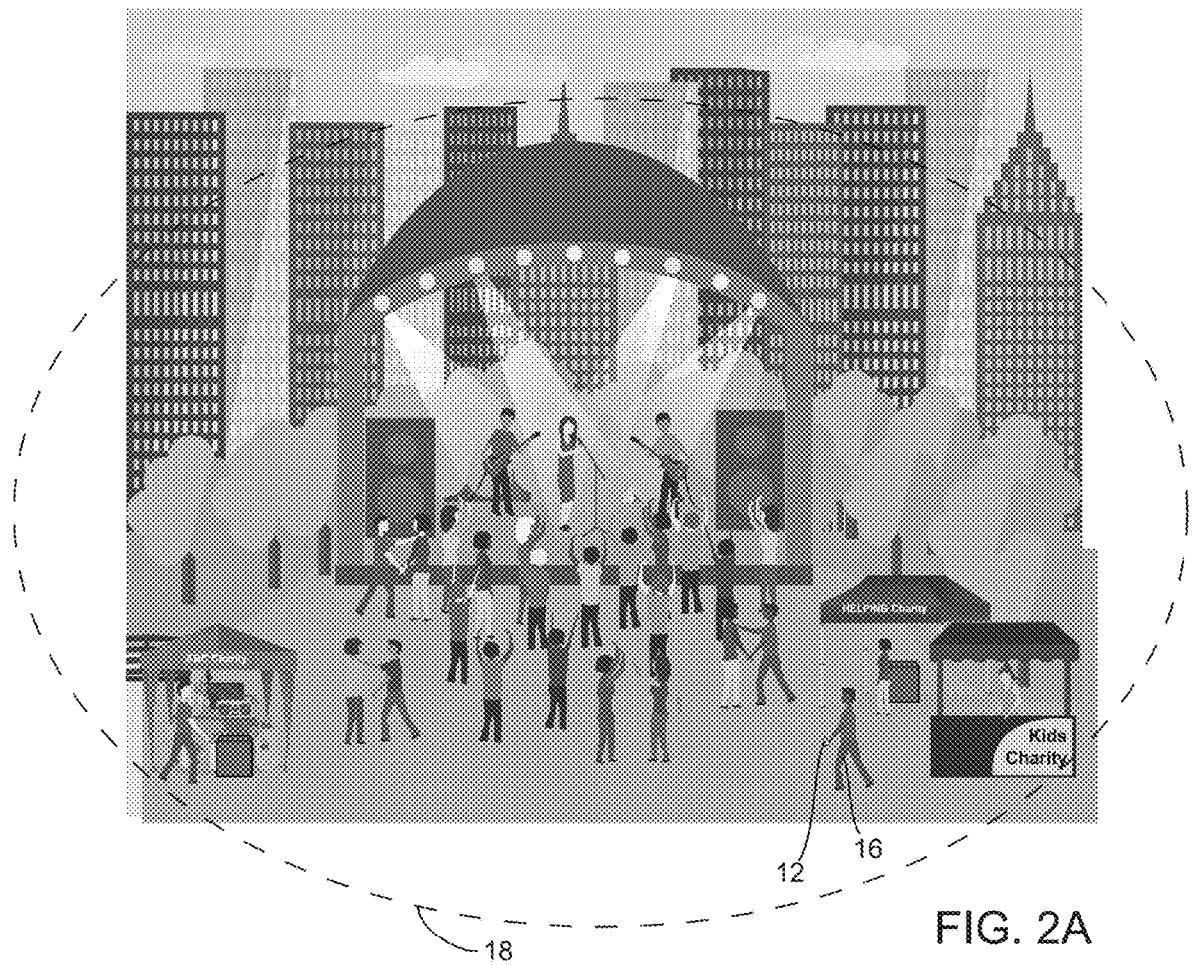
FIG. 2A is a view of volunteers using the volunteer connection system at a charitable event in accordance with an embodiment.
Figure 2B:
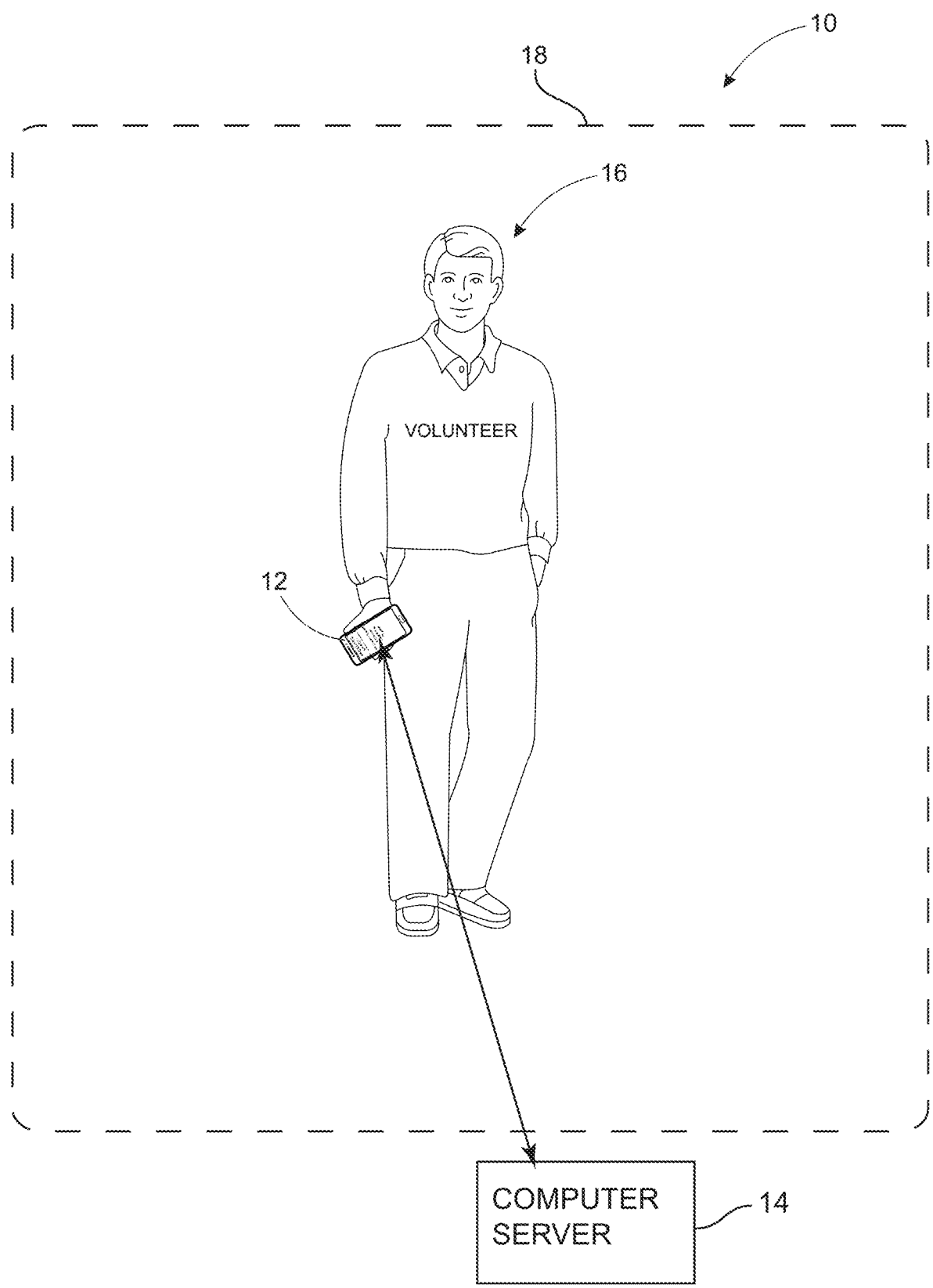
FIG. 2B is a view of a volunteer using the volunteer connection system in accordance with an embodiment.
Figure 3A:
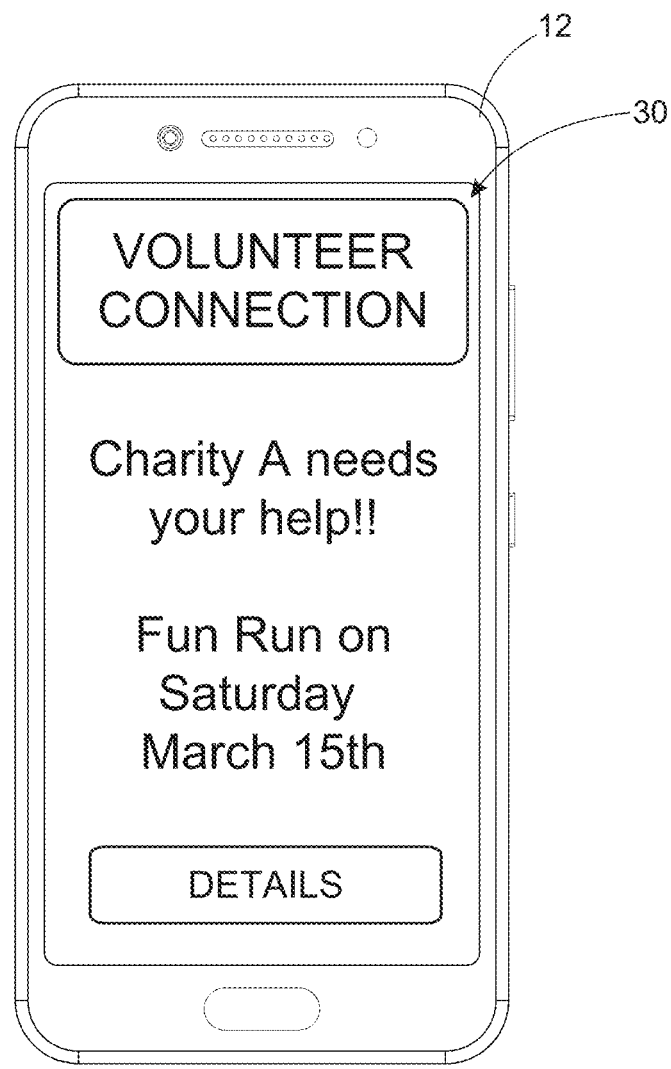
FIG. 3A is a view of a mobile computing device operating as part of a volunteer connection system with a charity broadcasting an advertisement of volunteer needs in accordance with an embodiment.
Figure 3B:
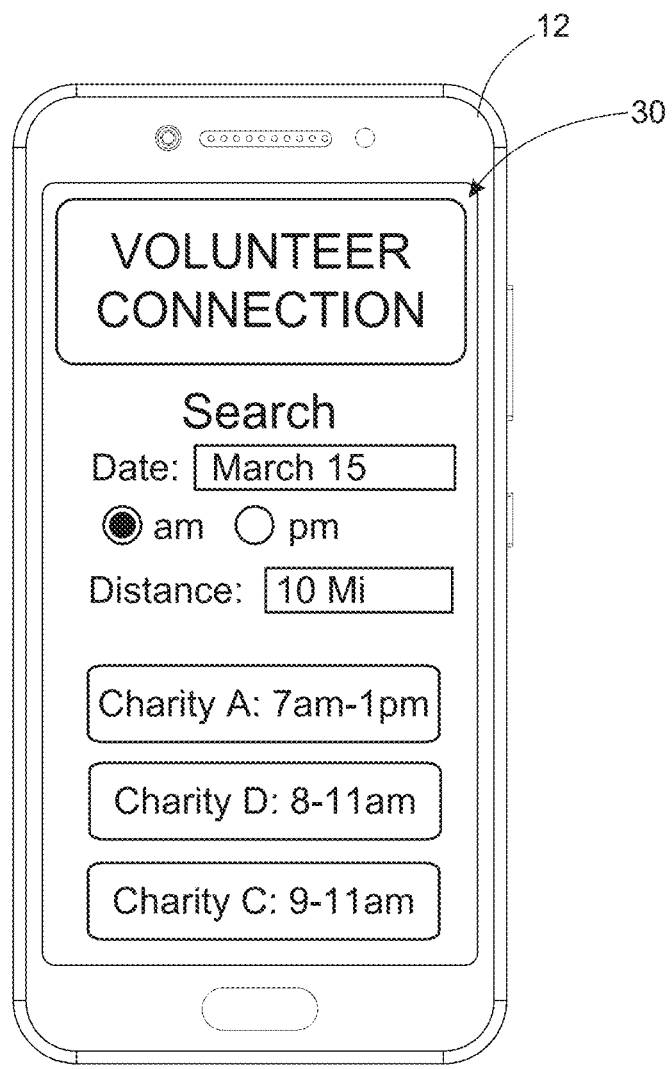
FIG. 3B is a view of a mobile computing device operating as part of a volunteer connection system with a volunteer searching for opportunities in accordance with an embodiment.
Figure 3C:
FIG. 3C is a view of a mobile computing device operating as part of a volunteer connection system showing volunteer opportunity details in accordance with an embodiment.

FIGS. 2-4E depict a volunteer connection system 10 in operation. FIG. 2 depicts an event that may include one or more charities/businesses that are registered with the system 10, such as, without limitation, ABC Charity, HELPING Charity and Kids charity as depicted in FIG. 2, with a closer view of similar scenario depicted in FIG. 3. In operation, one of the organizations may need additional volunteers. The system 10 may be accessed by the organization through the organization computing device 13 operating an organization volunteer application. The organization computing device 13 may then through a user interface request volunteers through the system 10, wherein a signal is sent from the organization computing device 13 to the server 14. The server 14 may then generate and send the request for volunteers to a plurality of user computing devices 12 as shown in FIG. 3A. Alternatively, the users may search for volunteer opportunities using the user computing device 12 as shown in FIG. 3B, having various opportunities along with distance, time of start and end of the volunteer service. Once the user selects the volunteer opportunity either from the request in FIG. 3A or from the search of FIG. 3B, the users may be directed to an interface shown in FIG. 3C that provides details of the event, along with a button to learn more about the charity and a button to accept the volunteer opportunity. Users may utilize his or her user computing device 12 to accept the request or searched event and then receive event information including a location and time to report to the event. The organization may select or filter what types of volunteers receive the request, such as establishing volunteer criteria that may comprise, for example, "approved for court ordered community service", "approved for school community service", location, age of volunteer, identified gender of volunteer and the like or combinations thereof. The request may then be sent by the server to all user computing devices with users that match the criteria.

Figure 4A:
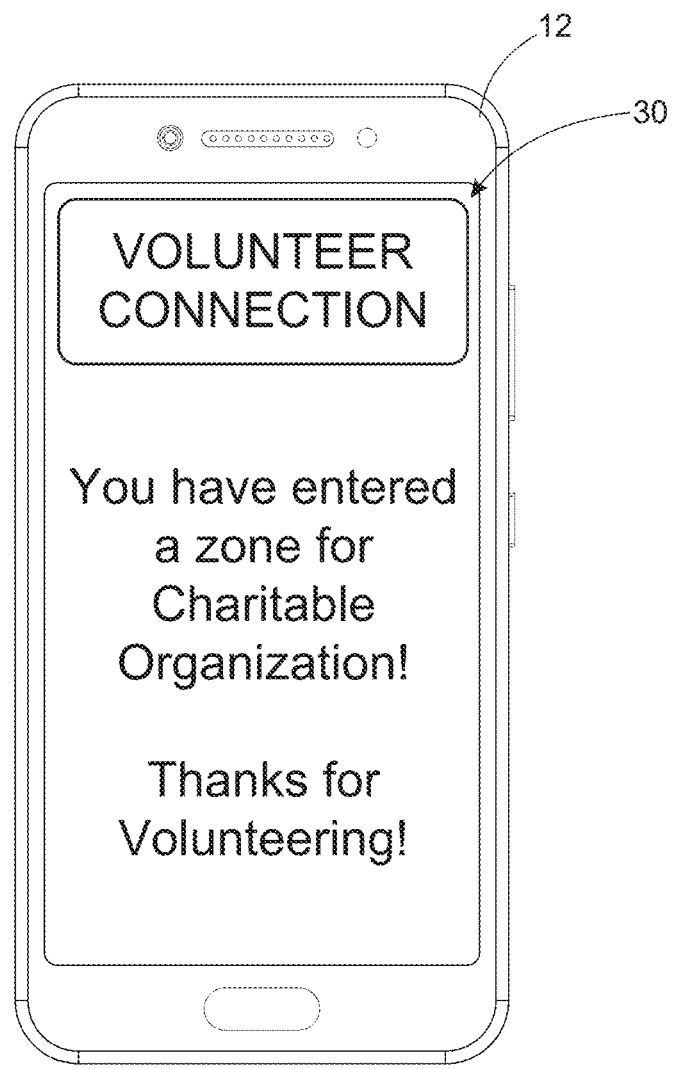
FIG. 4A is a view of a mobile computing device operating as part of a volunteer connection system in accordance with an embodiment.
Figure 4B:
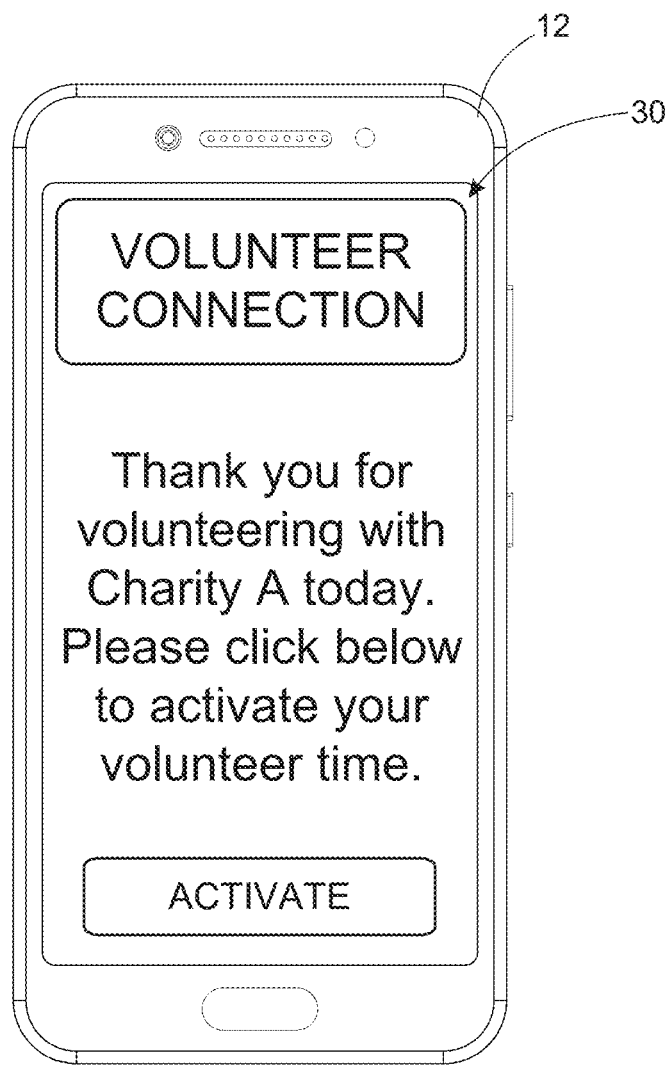
FIG. 4B is a view of a mobile computing device operating as part of a volunteer connection system to activate volunteer time in accordance with an embodiment.
Figure 4C:
FIG. 4C is a view of a mobile computing device operating to authenticate the volunteer as part of a volunteer connection system in accordance with an embodiment.

FIG. 4A shows user (volunteer) 16 with user computing device 12 operating a volunteer application 30. While operating the volunteer application 30 with the user computing device 12 within the proximity zone 18, various information may be displayed. The user computing device 12 automatically sends a signal to the server 14 indicating that the user computing device 12 is within the proximity zone 18 when the user computing device enters the proximity zone 18. A connection is established between the user computing device 12 and the server 14 for communication therebetween. The date and time the user computing device 12 is within the proximity zone may be recorded and stored on the server 14. The server 14 may deliver a message to the user computing device through the connection to verify that the organization is legitimate and confirms such with the message on the user computing device 12, as shown in FIG. 4A. In other embodiments, as shown in FIG. 4B the system may be activated by the user in order to start logging time the user is volunteering. In embodiments, the system 10 may allow or may require the volunteer to authenticate her as a volunteer, approved by the charity or authenticate that it is at the location within the proximity zone 18. This may be done for example by taking a photo or video of herself using a camera on the user computing device 12 and submitting for authentication as shown in FIG. 4B. This photo or video may include a geo-location metadata that can verify or authenticate that the volunteer is actually in the proximity zone 18. This may be utilized to avoid someone sending in his or her mobile device 12 with someone else into the proximity zone 18 to register volunteer time without actually volunteering.

The system 10 may then be utilized to direct volunteers from location to location within the proximity zone 18 based on need and in response to the organization requesting such move sent from the organization computing device. In some embodiments, the organization may request a general amount of volunteers at various locations and the system 10 may operate to automatically allocate volunteers based on proximity to the location and the demand for the additional volunteers at each location needing volunteers.

Figure 4D:
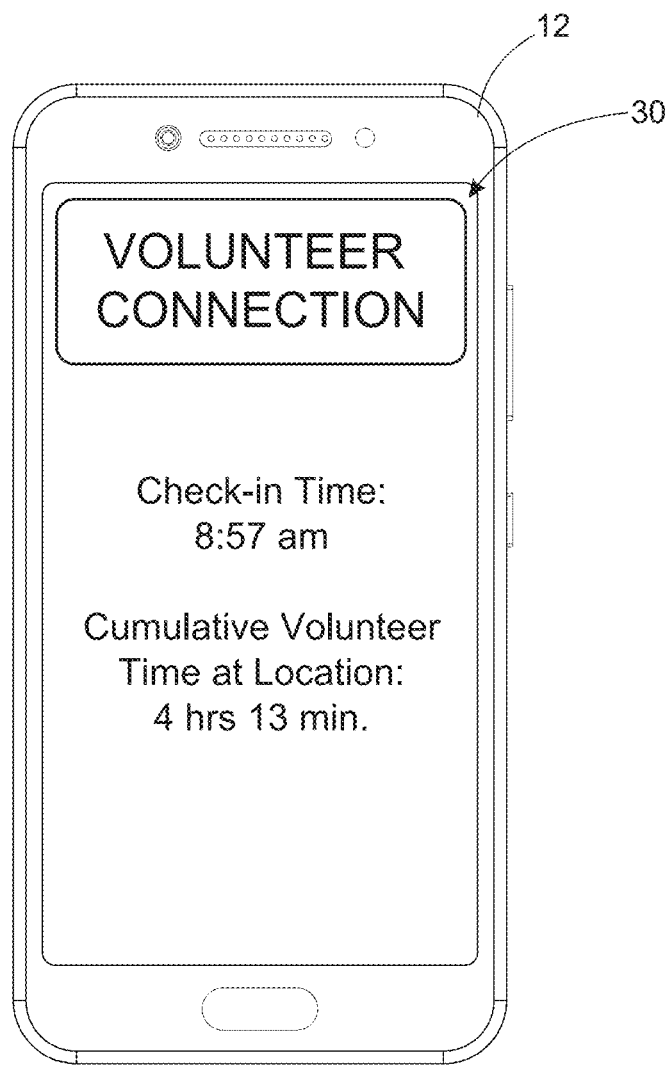
FIG. 4D is a view of a mobile computing device operating to depict volunteer time as part of a volunteer connection system in accordance with an embodiment.

Throughout a predetermine amount of time, such as, but not limited to, a day, the user computing device 12 may be within and outside of the proximity zone 18 such as for breaks, like lunch breaks. The server 14 may be programmed to determine the amount of time the user computing device is within the proximity zone 18 and records the amount of time between each entry into the proximity zone until and exit from the proximity zone and records the amount of time on the server associated with the user as part of the user data. This is performed for each instance that the user computing device 12 enters within the proximity zone 18. With reference to FIG. 4D, for example, and without limitation, the system 10 may record the time entered within the proximity zone 18 and depict it as a "Check-in Time" for example. The server 14 may also aggregate all of the time the user computing device 12 is within the proximity zone 18 for a predetermine time period and depict the same on the user computing device 12. The aggregation of time may include all time within the proximity zone 18 less any amount of time the user computing device exited the proximity zone 18, see FIG. 4D. Further, because the proximity zone 17 operates to the determine location of the volunteer area, the user computing devices 12 may also include the use of a location device, like a GPS device to determine that the user is within the proximity zone 18. The server operates to record this location and store in the user data on the server 14.

Figure 4E:
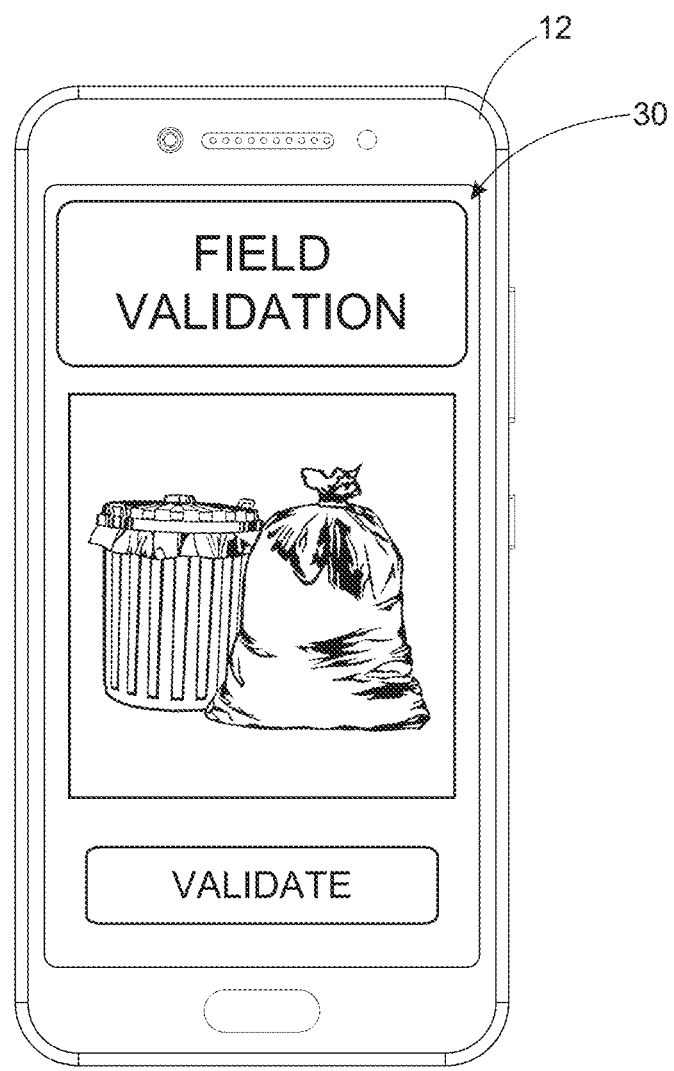
FIG. 4E is a view of a mobile computing device operating as part of a volunteer connection system for field validation in accordance with an embodiment.

In additional embodiments as shown in FIG. 4E, the user computing device 12 may be utilized for field validation to ensure the volunteer is indeed still working. One example, without limitation, may include the volunteer validating his or her charitable service using the user computing device 12, such as taking a photo of service performed and validating by sending the photo through the system. The system may operate to apply a geo-tag to the photo for validation, wherein the geo-tag can be processed by the server 14 to confirm that the user computing device 12 is within the proximity zone 18 when taking and sending the validation photo and further can validate that the photo is taken and sent during the designated period of time that the volunteer is intended to be serving the charitable organization at the event. The system may operate to prompt the volunteer to validate the charitable services.

Figure 4F:
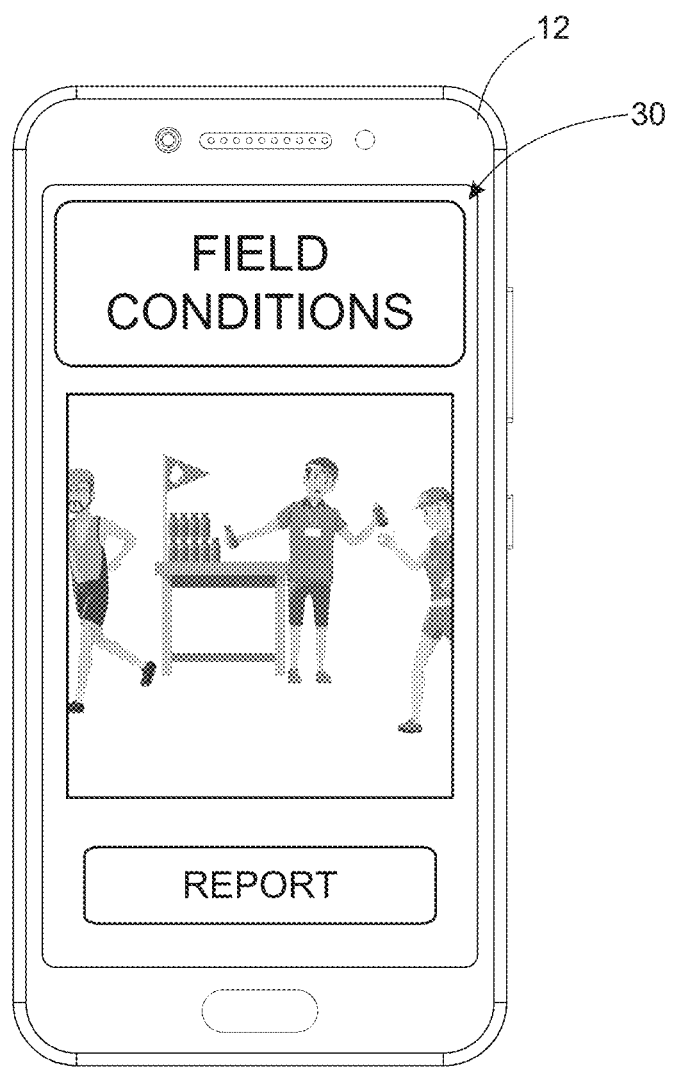
FIG. 4F is a view of a mobile computing device operating as part of a volunteer connection system for field validation in accordance with an embodiment.

Referring to FIG. 4F, the user computing device 12 may be utilized to report field conditions. As depicted in in FIG. 4F the field condition may be the current stock of water at a water stand along a fun run course. It will be understood that other field conditions may be reported utilizing the system, such as, without limitation, weather, ground conditions, long lines, additional help needed at an event station, almost complete at one station so that volunteer resources can be repurposed in other parts of the charitable event, and so forth. The field conditions may be reported and direction sent to user computing device 12 of volunteers giving instruction to move to various locations within the event location and proximity zone or to address certain issues reported using the field condition reporting. Field reporting conditions may include the sending of an image, photo, audio, text or combinations there of to accurately depict and report the field condition.

Figure 5A:
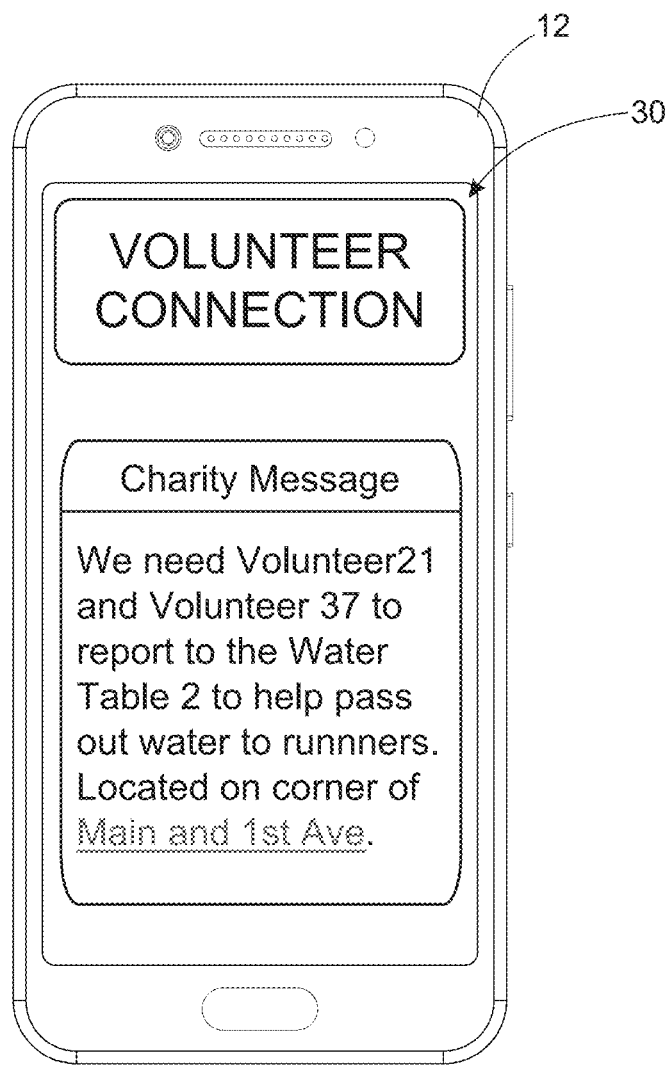
FIG. 5A is a view of a mobile computing device operating as part of a volunteer connection system for charity messaging in accordance with an embodiment.
Figure 5B:
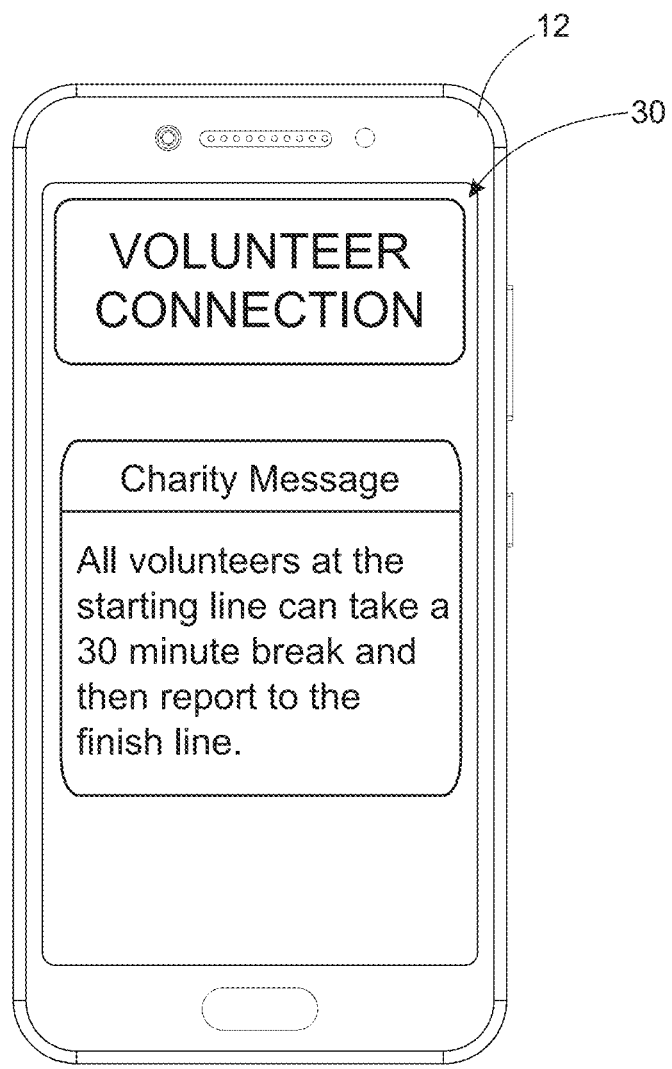
FIG. 5B is another view of a mobile computing device operating as part of a volunteer connection system for charity messaging in accordance with an embodiment.
Figure 5C:
FIG. 5C is yet another view of a mobile computing device operating as part of a volunteer connection system for charity messaging in accordance with an embodiment.

Further still, in some embodiments, as depicted in FIGS. 5A-5C, the system may allow the volunteer to send communications with organization associated with the volunteer effort, thereby allowing the volunteer to manually start and stop a timer to account for the time the volunteer is in the act of work in behalf of an organization. The user computing device may then allow the user to report the accumulated volunteer hours to the server 14 for storing in the memory of the server 14 in order to aggregate all of the volunteer time corresponding to the organization.

All of this data may be reported to a server and be retrieved with user permission by the charity volunteered for, a family group, school program, workplace volunteer campaign and the like. This helps to verify the amount of time the user actually volunteers and provides an auditable database of information associated with volunteer hours in order to have more accurate accounting and recording of the same. The report may be made by any approved individual or entity that has access to the system 10.

In embodiments, organizations may post various needs for volunteers at different events and/or locations. These volunteer opportunities may be searched by the volunteers through the user computing devices 12. Certain filters can be put in place, such as, but not limited to, "approved for institutional required community service", "approved for school community service", location, age of volunteer, skills, interests, availability and the like. It will be understood that the system may also be useful for institutional required volunteer time. Examples of institutional required volunteer time may include, but is not limited to, state bar requirements for pro bono hours for attorneys, required community service, business service initiatives, and the like.

It will be understood that the system 10 may be utilized by government and/or civic leaders in instances such as natural disasters or other emergency needs. As such, the system may allow for ease of communication with individuals and further, as clean-up or other services are needed, the system can be utilized to deploy resources, such as, but not limited to volunteers with certain physical resources can be directed to a particular location while volunteers having certain skills (such as medical) can be directed to another location through the system. The system operates in a manner consistent with what has been disclosed above in when utilized by government and/or civic leaders.

Figure 7:
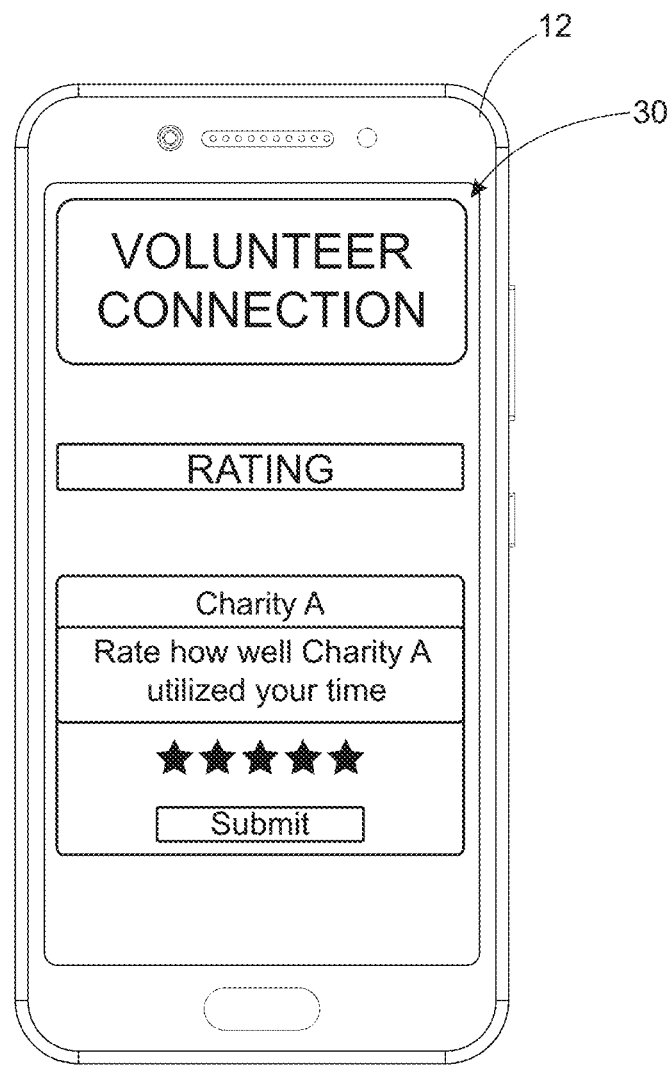
FIG. 7 is a view of a mobile computing device operating as part of a volunteer connection system for rating a charitable organization in accordance with an embodiment.
Figure 8:
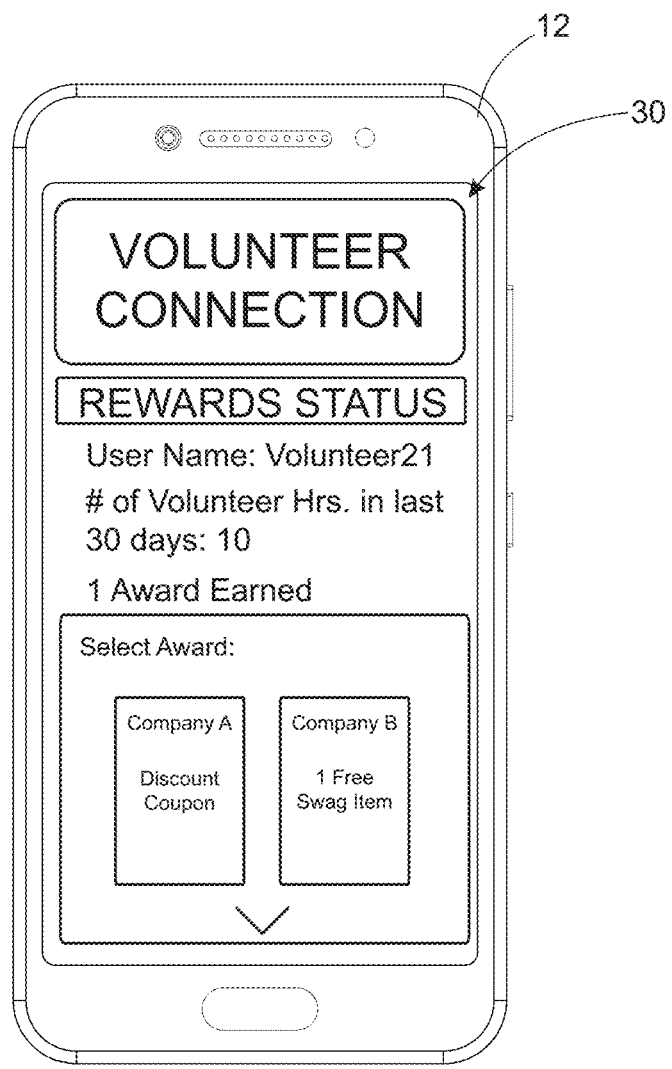
FIG. 8 is a view of a mobile computing device operating as part of a volunteer connection system for obtaining awards in accordance with an embodiment.

The system may provide the opportunity to rate the charitable organization using the system 10. For example, the volunteer may utilize the user computing device 12 to rate how well the charity utilized the volunteers time, as depicted in FIG. 7. This rating can be displayed to future volunteers and may be a basis for sorting or filtering volunteer opportunities. Additionally, volunteers utilizing the system may earn awards or rewards based on the cumulative hours of volunteer service, such as predetermine amount of service hours within a predetermined time frame as shown in FIG. 8. The rewards may be discount coupons or the like. In such instances, the awards and use of the system may be in compliance with permissible charity guidelines, pertinent state laws and the like.

Figure 9:
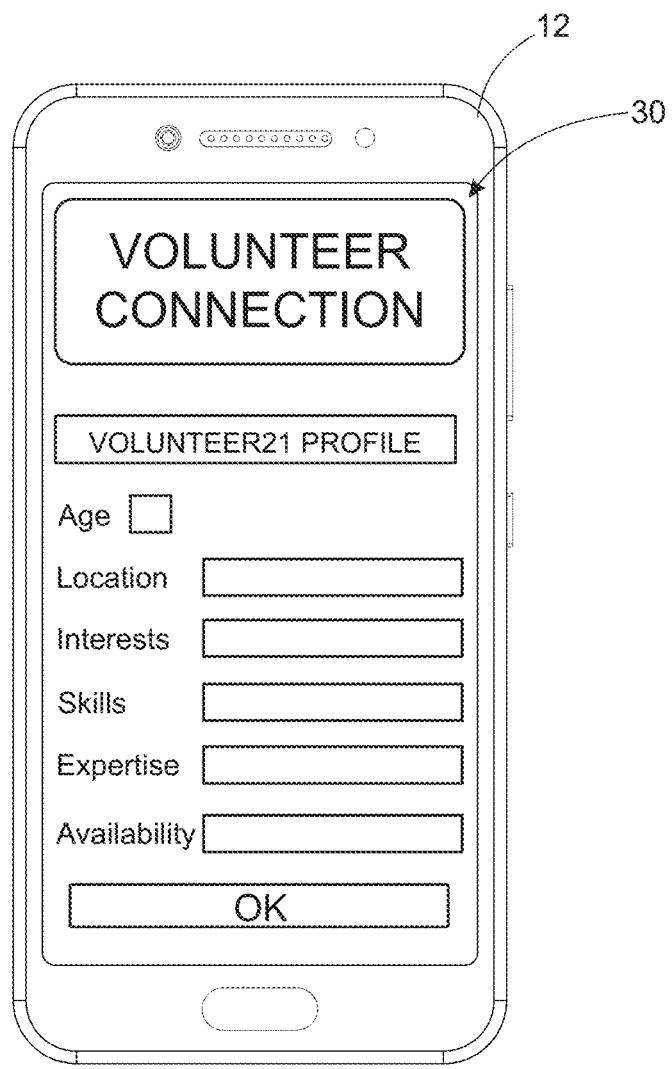
FIG. 9 is a view of a mobile computing device operating as part of a volunteer connection system for entering volunteer profile information in accordance with an embodiment.

In order to sort volunteer opportunities and match with available volunteers, the volunteer may include a profile that is stored on the server. The volunteer profile may be entered using a user computing device 12 as shown in FIG. 9. The volunteer profile may include, without limitation, age, location, interests, skills, expertise, availability and the like. In some embodiments, certain charities may require volunteer background screening and the system 10 may provide a mechanism for volunteers to upload necessary personal information for charities to perform background screening or upload prescreened confirmation into the user profile to accommodate charity requirements.

Figure 10:
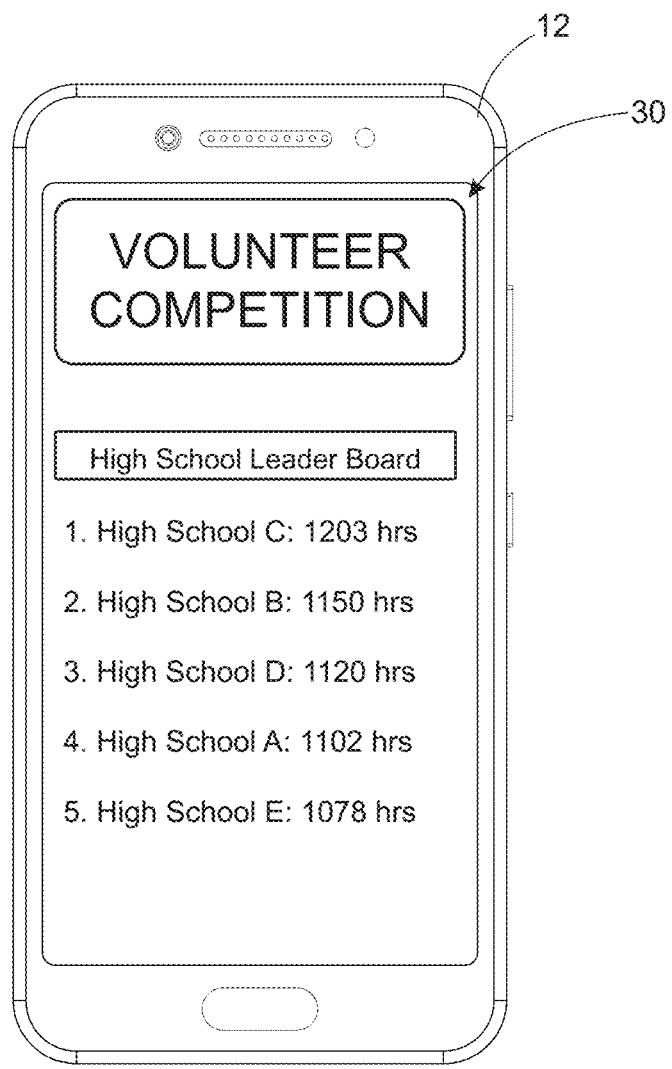
FIG. 10 is a view of a mobile computing device operating as part of a volunteer connection system for displaying group competitive volunteer hours in accordance with an embodiment.

In some embodiments, as depicted in FIG. 10, the system may provide for fun competitions between groups. For example, and without limitation, the groups may be high schools and the competition may be total volunteer hours during a certain period of time. The system may track all volunteer time and aggregate the data based on group association. The system may depict the real time results as shown in user computing device 12 in FIG. 10. The competition may be in good nature and utilized to encourage participation and community service.

Figure 11:
FIG. 11 is a view of a website of an organization connected to the system to display cumulative volunteer time from employees of the organization in accordance with an embodiment.

In some embodiments, as shown in FIG. 11, the system may allow organizations to engage with the system and display information on the organization website or even social media platforms. For example, the system logs and aggregates total cumulative volunteer hours for users of the system, that may include employees of an organization. The organization may receive total hours volunteered by all employees of the organization and display such on the organization website or the like. The hours may be updated, such as updating in near real time updates as shown in FIG. 11.

Embodiments may be available on or through the internet, such as through domain names reserved and owned by Applicant that include charity-hours.com, give-time.com, volunteer-mytime.com, volunteer-myhours.com, helping-hours.com, good-hours.com, hours-report.com, hearthours.com, helping-time.com, volunteer-friend.com, volunteer-clock.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A volunteer connection system comprising:
    a computer server having a memory storing organization data of an organization and user data of a user;
    an organization computing device of the organization coupled to the computer server, the organization computing device associated with the organization registered with the volunteer connection system; and
    one or more user computing devices of the user coupled to the computer server, the computer server programmed to:
        receive a signal having a volunteer request for volunteers from the organization computing device and automatically generate and send the volunteer request for the volunteers for the organization to the one or more user computing devices;
        receive from the one or more user computing devices a signal indicating acceptance of the volunteer request for the volunteers for an event;
        automatically generate and send to the one or more computing devices accepting the event, event information comprising event location;
        generate and establish a proximity zone at a specified geo-location of the event;
        receive a signal from the one or more user computing devices that the one or more user computing devices have entered the proximity zone and automatically establish a connection between the computer server and the one or more user computing devices in response to the one or more user computing devices entering the proximity zone;
        automatically generate and send for display on the one or more user computing devices a volunteer interface comprising a message indicating the one or more user computing devices have entered the proximity zone;
        automatically track and store volunteer data of the user comprising an accumulated amount of time the one or more user computing devices are within the proximity zone during a designated period of time and locations of the one or more user computing devices within the proximity zone, wherein the organization tracks how many of the one or more user computing devices are within the proximity zone;
        validating charitable service of a volunteer in response to receiving a photo of service performed by the volunteer from the user computing device, wherein the user computing device applies a geo-tag to the photo to confirm that the user computing device is within the proximity zone when taking and sending the photo for validation of service performed; and
        generating a report that comprises verified volunteer location of performed charity work, time that the volunteer performed the charity work, and cumulative hours of charity work for a predetermined period time.

2. The volunteer connection system of claim 1, wherein the organization data comprises verification information that the organization is registered with the system.

3. The volunteer connection system of claim 1, wherein the user data comprises name and contact information of the user.

4. The volunteer connection system of claim 3, wherein the contact information comprises address, email and/or phone number.

5. The volunteer connection system of claim 1, wherein the organization is a charitable organization.

6. The volunteer connection system of claim 1, further comprising more than one organization.

7. The volunteer connection system of claim 6, wherein the one or more user computing devices are programmed to search for the more than one organization having the volunteer request for the volunteers.

8. The volunteer connection system of claim 1, wherein the volunteer data of the user is reported to the server and retrieved by the organization with user permission.

9. The volunteer connection system of claim 1, wherein the one or m ore user computing devices comprises a timer thereby allowing the user to manually start and stop the timer within the proximity zone.

10. The volunteer connection system of claim 1, wherein the one or more user computing devices comprises a camera for authenticating the user is within the proximity zone.

11. The volunteer connection system of claim 10, wherein the camera takes a photo or video of volunteer services performed.

12. The volunteer connection system of claim 1, wherein the user is affiliated with a group or team.

13. The volunteer connection system of claim 1, wherein the computer server automatically sends verification to the one or more user computing devices in response to the one or more user computing devices entering the proximity zone that the organization is legitimate and/or the proximity zone is associated with the organization.

14. The volunteer connection system of claim 1, wherein the user is directed to move from a first location to a second location in the proximity zone in response to the organization requesting the move sent from the organization computing device.

15. The volunteer connection system of claim 1, wherein the one or more user computing devices reports field conditions in the proximity zone to the organization computing device.

16. A volunteer connection system comprising:
    a computer server having a memory storing organization data of an organization and user data of a user;
    an organization computing device of the organization coupled to the computer server, the organization computing device associated with the organization registered with the volunteer connection system; and
    one or more user computing devices of the user coupled to the computer server, the computer server programmed to:
        receive a signal having a volunteer request for volunteers from the organization computing device and automatically generate and send the volunteer request for the volunteers for the organization to the one or more user computing devices;
        receive from the one or more user computing devices a signal indicating acceptance of the volunteer request for the volunteers for an event;
        automatically generate and send to the one or more computing devices accepting the event, event information comprising event location;
        generate and establish a proximity zone at a specified geo-location of the event;
        receive a signal from the one or more user computing devices that the one or more user computing devices have entered the proximity zone and automatically establish a connection between the computer server and the one or more user computing devices in response to the one or more user computing devices entering the proximity zone;

automatically generate and send for display on the one or more user computing devices a volunteer interface comprising a message indicating the one or more user computing devices have entered the proximity zone;

automatically send verification to the one or more user computing devices in response to the one or more user computing devices entering the proximity zone that the organization is legitimate and/or the proximity zone is associated with the organization;

automatically track and store volunteer data of the user comprising an accumulated amount of time the one or more user computing devices are within the proximity zone during a designated period of time and locations of the one or more user computing devices within the proximity zone;

validating charitable service of a volunteer in response to receiving a photo of service performed by the volunteer from the user computing device, wherein the user computing device applies a geo-tag to the photo to confirm that the user computing device is within the proximity zone when taking and sending the photo for validation of service performed; and generating a report that comprises verified volunteer location of performed charity work, time that the volunteer performed the charity work, and cumulative hours of charity work for a predetermined period time.

17. A volunteer connection system comprising:

a computer server having a memory storing organization data of an organization and user data of a user;

an organization computing device of the organization coupled to the computer server, the organization computing device associated with the organization registered with the volunteer connection system; and one or more user computing devices of the user coupled to the computer server, the computer server programmed to:

receive a signal having a volunteer request for volunteers from the organization computing device and automatically generate and send the volunteer request for the volunteers for the organization to the one or more user computing devices;

receive from the one or more user computing devices a signal indicating acceptance of the volunteer request for the volunteers for an event;

automatically generate and send to the one or more computing devices accepting the event, event information comprising event location;

generate and establish a proximity zone at a specified geo-location of the event;

receive a signal from the one or more user computing devices that the one or more user computing devices have entered the proximity zone and automatically establish a connection between the computer server and the one or more user computing devices in response to the one or more user computing devices entering the proximity zone;

automatically generate and send for display on the one or more user computing devices a volunteer interface comprising a message indicating the one or more user computing devices have entered the proximity zone;

automatically track and store volunteer data of the user comprising an accumulated amount of time the one or more user computing devices are within the proximity zone during a designated period of time and locations of the one or more user computing devices within the proximity zone, wherein the user is directed to move from a first location to a second location in the proximity zone in response to the organization requesting the move sent from the organization computing device;

validating charitable service of a volunteer in response to receiving a photo of service performed by the volunteer from the user computing device, wherein the user computing device applies a geo-tag to the photo to confirm that the user computing device is within the proximity zone when taking and sending the photo for validation of service performed; and generating a report that comprises verified volunteer location of performed charity work, time that the volunteer performed the charity work, and cumulative hours of charity work for a predetermined period time.

* * * * *